US006910369B2

United States Patent
Okuda et al.

(10) Patent No.: US 6,910,369 B2
(45) Date of Patent: Jun. 28, 2005

(54) APPARATUS FOR DETECTING COMPRESSION TOP DEAD CENTER OF AN ENGINE

(75) Inventors: Yoshifumi Okuda, Shiga-ken (JP); Yahiko Iwasaki, Shiga-ken (JP); Yuzo Uotani, Hiroshima-ken (JP); Kenji Nakatsu, Hiroshima-ken (JP); Satoshi Miyahira, Hiroshima-ken (JP)

(73) Assignee: Daifuku Co., Ltd, Osaka (JP)

( * ) Notice: Subject to any disclaimer, the term of this patent is extended or adjusted under 35 U.S.C. 154(b) by 62 days.

(21) Appl. No.: 10/602,932

(22) Filed: Jun. 24, 2003

(65) Prior Publication Data
US 2004/0255653 A1 Dec. 23, 2004

(30) Foreign Application Priority Data

Jun. 25, 2002 (JP) ...................................... 2002-184577

(51) Int. Cl.[7] ............................................. G01M 15/00
(52) U.S. Cl. ........................................... 73/115; 73/116
(58) Field of Search ............................... 73/40, 46, 47, 73/49.7, 112, 115, 116, 117.2, 117.3, 118.1, 119 R

(56) References Cited

U.S. PATENT DOCUMENTS

| 3,889,528 | A | * | 6/1975 | Grikscheit et al. ........ 73/119 R |
| 4,331,029 | A | * | 5/1982 | Wilson ........................ 73/117.3 |
| 4,384,480 | A | * | 5/1983 | Krage et al. ................... 73/116 |
| 4,505,152 | A | * | 3/1985 | Haddox ...................... 73/117.2 |
| 4,633,707 | A | * | 1/1987 | Haddox ........................... 73/47 |
| 4,653,315 | A | * | 3/1987 | Ament et al. ............... 73/117.3 |
| 4,683,747 | A | * | 8/1987 | Hall .......................... 73/119 R |
| 5,355,713 | A | * | 10/1994 | Scourtes et al. ............. 73/117.2 |
| 5,459,940 | A | * | 10/1995 | McKenzie .................... 33/601 |
| 5,780,730 | A | * | 7/1998 | Scourtes et al. ............ 73/117.2 |
| 6,367,317 | B1 | * | 4/2002 | Jaye ............................. 73/116 |

FOREIGN PATENT DOCUMENTS

| JP | H2-55738 | 8/1986 |
| JP | 2001-082238 | 3/2001 |

* cited by examiner

Primary Examiner—Eric S. McCall
(74) Attorney, Agent, or Firm—The Webb Law Firm

(57) ABSTRACT

An apparatus for detecting a compression top dead center phase includes an external driving portion for driving a crankshaft of an engine, a phase sensor for detecting a top dead center phase of the crankshaft, which corresponds to a top dead center position of a specified cylinder of the engine, an exhaust pressure sensor that is arranged in an exhaust duct connected to an exhaust port of the engine, and that detects an exhaust pressure in the exhaust duct, and a controller that receives a signal from the exhaust pressure sensor.

13 Claims, 3 Drawing Sheets

APPARATUS FOR DETECTING COMPRESSION TOP DEAD CENTER OF AN ENGINE

BACKGROUND OF THE INVENTION

1. Field of the Invention

The present invention relates to an apparatus that is attached to an engine under test and detects the compression top dead center during the compression stroke of that engine.

2. Description of the Related Art

Conventionally, apparatuses for so-called "cold testing" have been used to test an engine without running it. This type of apparatus is provided with a driving portion that is connected to the engine's crankshaft and that forces that crankshaft to rotate to perform various kinds of engine tests, such as for the open and close timing of the intake valve or the exhaust valve.

Such cold testing is performed not only on finished engines, but also on engines that are not fully assembled, such as engines to which the injection nozzles and spark plugs have not yet been installed. Such engine testing can, thus, reduce the manpower necessary for any design changes.

When performing the various engine tests mentioned above, the compression top dead center of the engine being tested is ordinarily set as a reference point. Here, the compression top dead center is defined as the phase of the crankshaft corresponding to the top dead center of the piston during a compression stroke of the engine under test. Consequently, the compression top dead center of the engine under test needs to be detected before the engine tests.

Among conventional compression top dead center detection apparatuses, as disclosed for example in JP 2001-82238A, there are apparatuses that detect the compression pressure within the cylinders with pressure sensors that are attached to mounting holes for the injection nozzles or spark plugs of the engine under test. These apparatuses rotate the crankshaft of the engine under test from the outside with a motor, detect the rotation phase of the crankshaft with a rotation sensor, furthermore detect the phase of the crankshaft corresponding to the maximum pressure detected by the pressure sensor, and detect the compression top dead center phase from the phase corresponding to this maximum pressure point, thus detecting the compression top dead center while the injection nozzles and spark plugs have not yet been installed.

In the above-mentioned JP 2001-82238A, the crankshaft is rotated at various rotation speeds from slow speeds to high speeds, and the maximum pressure phase is determined for each of those rotation speeds. Based on the relation between these maximum pressures phases and the rotation speeds, an experimental function is determined that has an asymptotic line for infinitely large rotation speeds, and the phase corresponding to this asymptotic line is detected as the compression top dead center phase.

However, there are times when engine testing has to be performed with the injection nozzles and spark plugs already put in place. But with the above-described conventional apparatus, this is not possible, because it is designed to use the mounting holes for the injection nozzles and spark plugs of the engine to mount the pressure sensors.

SUMMARY OF THE INVENTION

In view of the above-described problems, it is an object of the present invention to provide an apparatus for detecting a compression top dead center that can detect the compression top dead center of an engine to be tested even when the injection nozzles and spark plugs have been mounted.

In accordance with the present invention, an apparatus for detecting a compression top dead center includes an external driving portion for driving a crankshaft of an engine, a phase sensor for detecting a top dead center phase of the crankshaft, which corresponds to a top dead center position of a specified cylinder of the engine, an exhaust pressure sensor that is arranged in an exhaust duct connected to an exhaust port of the engine, and that detects an exhaust pressure in the exhaust duct, and a controller that receives a signal from the exhaust pressure sensor.

With this apparatus for detecting a compression top dead center according to the present invention, no pressure sensor is attached to the mounting holes for injection nozzles or spark plugs, so that it is possible to detect the compression top dead center of an engine to be tested even when the injection nozzles and spark plugs have been mounted.

DETAILED DESCRIPTION OF THE PREFERRED EMBODIMENTS

A detailed description of preferred embodiments of the present invention is given next with reference to the accompanying drawings.

Figure 1:
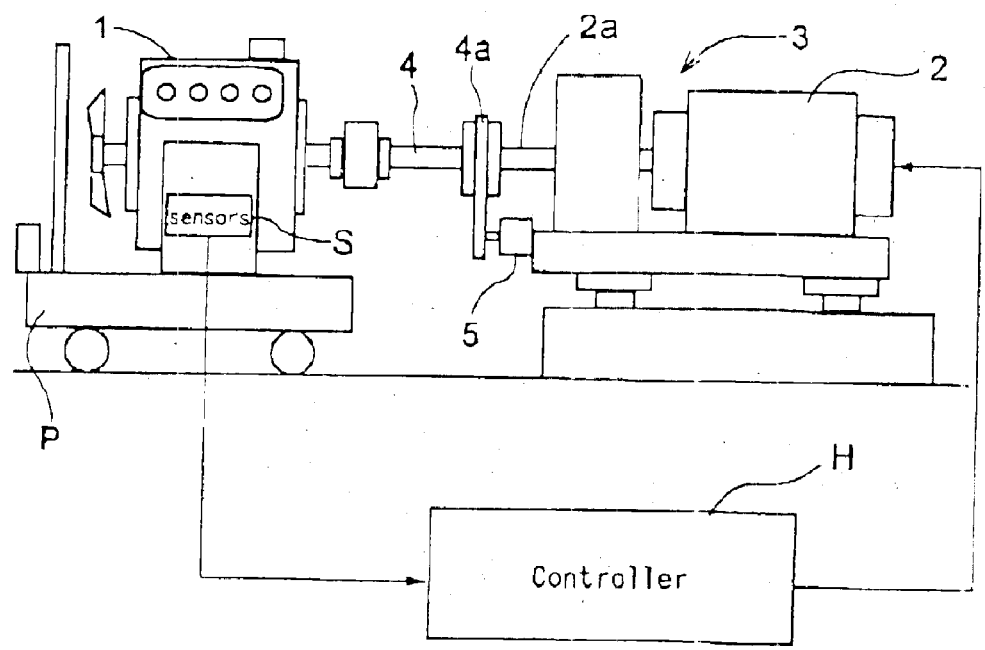
FIG. 1 is a conceptual diagram of an engine testing apparatus in accordance with the present invention.

As shown in FIG. 1, an engine testing apparatus in accordance with the present invention includes a driving portion 3, various sensors $, and a controller H. The driving portion 3 is connected to a crankshaft 4 of an engine 1 to be tested, which is placed on a pallet P, and includes an electric motor 2 that forces that crankshaft 4 to rotate. It is preferable that a shaft 2a of the electric motor 2 is attached, in any conventional manner, to a flywheel 4a which in turn is attached to the crankshaft 4.

The controller H, which includes a CPU and a memory, controls the rotation speed of the electric motor 2, and detects the compression top dead center, based on detection information of the various sensors S, which include an exhaust pressure sensor 16 (described later) mounted to the engine 1 under test. The controller also has the capability to carry out various kinds of engine tests, utilizing the detected compression top dead center as a reference position.

The engine testing apparatus is further provided with an encoder 5 serving as a phase sensor for detecting the rotation angle of the crankshaft 4. Based on the information detected by the encoder 5, the controller H detects the top dead center phase of the crankshaft 4. The information detected by the encoder 5 can be correlated with the top dead center of the engine cylinders by storing a signal from the encoder 5 when the cylinder has reached top dead center, or by any conventional method. Consequently, the encoder 5 and the controller H constitute a top dead center detection means.

Figure 2:
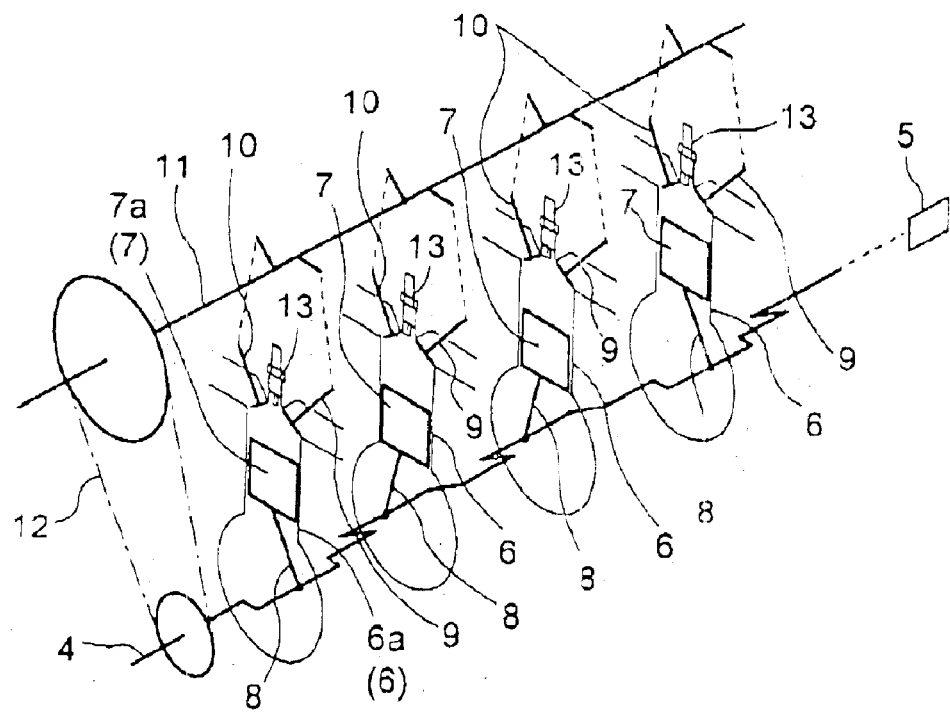
FIG. 2 is a conceptual diagram of an engine under test.

In this embodiment, a 4-cylinder 4-cycle engine, as shown in FIG. 2, is used as an example of the engine 1 under test. This engine is provided with a crankshaft 4 that is coupled via a connecting rod 8 to the pistons 7 of cylinders 6, and a cam shaft 11 having a cam for opening and closing intake valves 9 and exhaust valves 10. The crankshaft 4 and the cam shaft 11 are coupled by a timing belt 12 such that for every two rotations of the crankshaft 4, the cam shaft 11 makes one rotation.

The pistons 7 of the cylinders 6 move vertically as the crankshaft 4 rotate, and, the intake valves 9 and the exhaust valves 10 open and close as the cam shaft 11 rotates. The component denoted by the numeral 13 in FIG. 2 is a spark plug.

Of the four cylinders 6 of the engine 1, cylinder 6a is set as the reference cylinder 6a. As is shown in FIGS. 3A through 3D, an exhaust pressure sensor 16 is provided within an exhaust duct 15, which is airtightly connected to an exhaust port 14. In the exhaust duct 15, downstream from the position of this exhaust pressure sensor 16, an orifice 17 is provided that reduces the cross-sectional area of the exhaust duct. Thus, changes in the exhaust pressure within the exhaust duct 15 can be detected accurately with the exhaust pressure sensor 16.

Figure 3A:
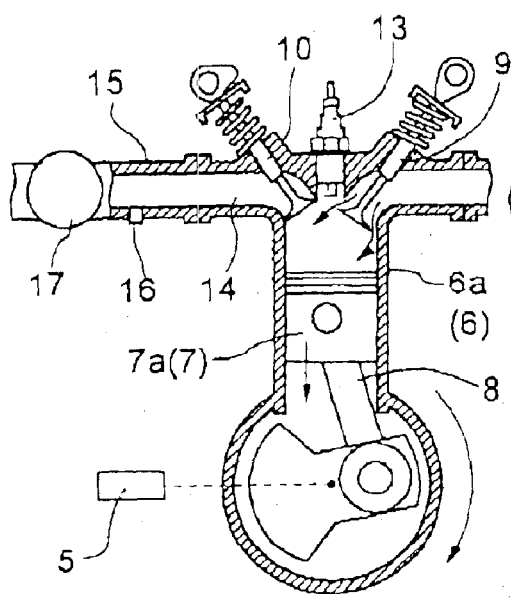
FIGS. 3A to 3D illustrates the steps in engine operation, showing the essential parts of the engine under test.
Figure 3B:
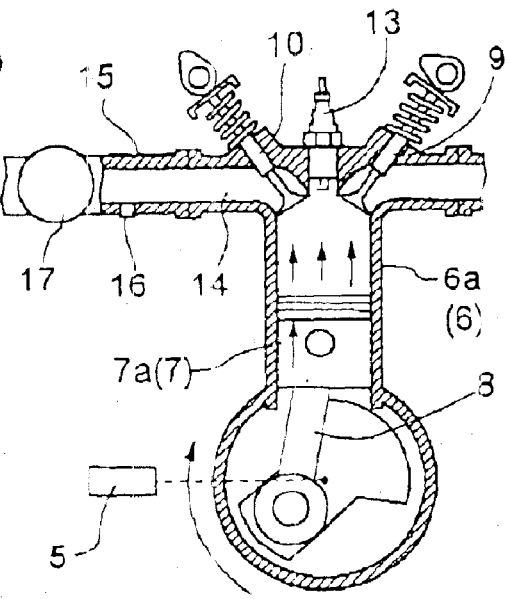
Figure 3C:
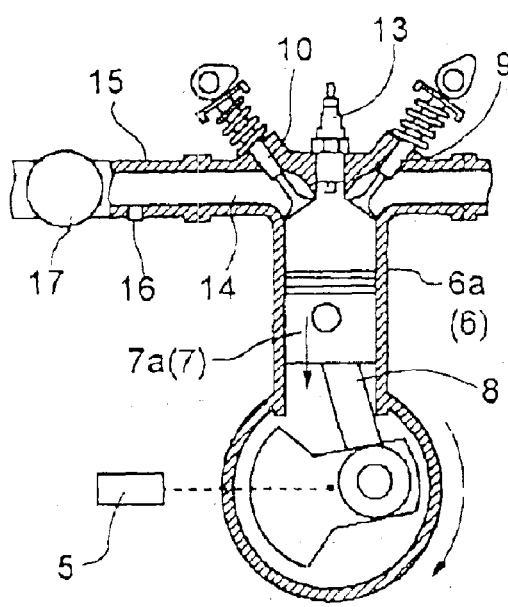
Figure 3D:
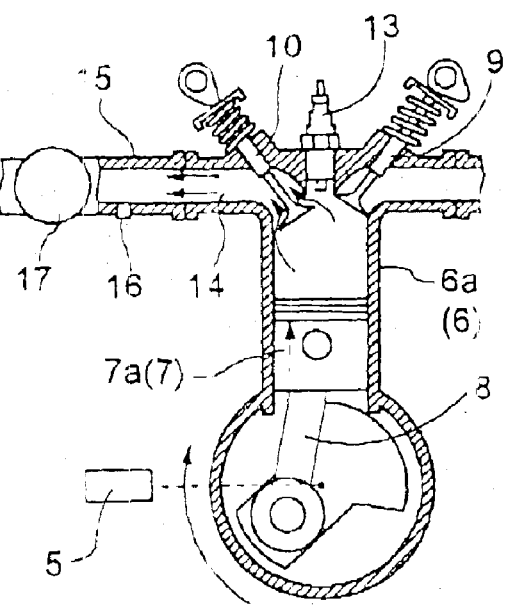

To test the engine, first, the engine 1 to be tested is placed on a pallet P, and is transported to the testing position with a transport device, such as a conveyor or a carriage. Then, the driving portion 3 is coupled fixedly to the flywheel 4a provided on the crankshaft 4. Next, the controller H lets the electric motor 2 rotate while controlling its rotation speed, so that the crankshaft 4 is forced to rotate by the electric motor 2 at the testing rotation speed. This causes the piston 7 to move up and down, as shown in FIGS. 3A through 3D. The intake valve 9 and the exhaust valve 10 open and close, and the engine 1 under test repeats the following sequence: intake stroke (FIG. 3A), compression stroke (FIG. 3B), expansion stroke (FIG. 3C) and exhaust stroke (FIG. 3D). Thus, cold testing is performed, in which various types of engine tests, such as performance or open/close timing of the intake valve 9 or the exhaust valve 10, can be carried out without actually running the engine.

With this engine testing apparatus, the compression top dead center of the engine 1 under test serves as the reference point for the various measurements during the above-described cold testing. Consequently, the controller H first detects the compression top dead center of the engine under test while the crankshaft 4 is rotated at a test rotation speed with the driving portion 3. That is to say, the controller H detects with the encoder 5 the top dead center phases of the crankshaft 4 corresponding to top dead center of the reference cylinder 6a, and detects an increase in exhaust pressure that accompanies the opening of the exhaust valve 10. Of the top dead center phases detected by the encoder 5, the controller H detects the top dead center phase before the exhaust pressure detected by the exhaust pressure sensor 16 increases as the compression top dead center phase. In the stroke in which an increase of the exhaust pressure is detected, the exhaust pressure is detected at least at two different phases of the crankshaft 4, the corresponding detection values are stored by the controller H, and those exhaust pressures are compared. It is preferable that at least two exhaust pressure values are detected during the compression stroke.

Figure 4:
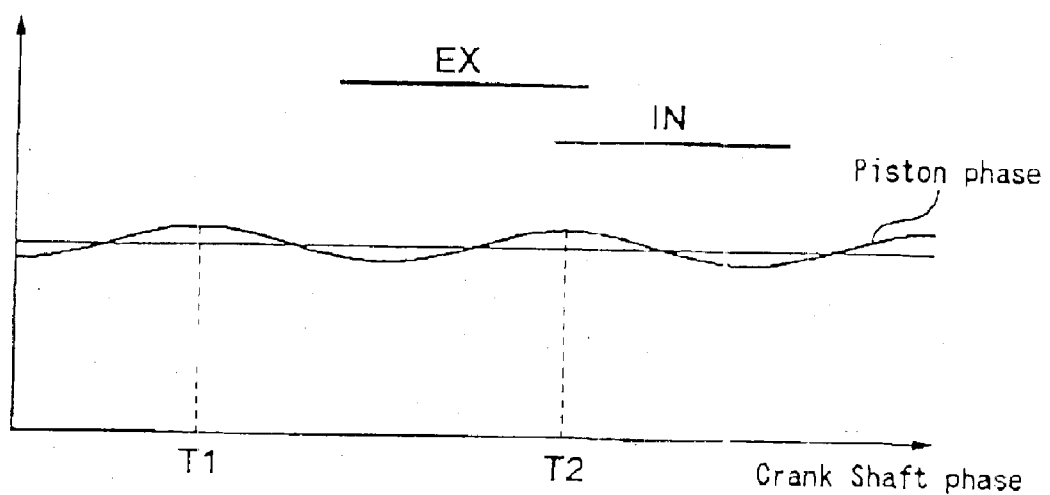
FIG. 4 is a graph illustrating crankshaft phase, piston phase, and opening/closing of the exhaust valve.

Referring to the graph in FIG. 4, the following is an explanation of the relation between the phase of the piston 7, the opening and closing of the exhaust valve 10, and the phase of the crankshaft 4 in the process of detecting the compression top dead center of the engine under test.

In 4-cycle engines, the piston 7 moves up and down twice during one sequence of intake stroke, compression stroke, expansion stroke and exhaust stroke, so that there is a top dead center in two strokes, namely the compression stroke and the exhaust stroke.

T1 and T2 in FIG. 4 denote the two top dead center phases of the crankshaft corresponding to the top dead center of the piston 7. EX denotes the range of phases during which the exhaust valve 10 is open, and IN denotes the range of the phases during which the intake valve 9 is open.

When the exhaust valve 10 is opened, the exhaust pressure in the exhaust duct 15 connected to the exhaust port 14 rises, so that of the two top dead centers T1 and T2 detected by the encoder 5, the top dead center phase T1, which immediately precedes the time when the exhaust pressure increases, as detected by the exhaust pressure sensor 16, is detected as the compression top dead center.

The exhaust valve 10 is opened for a period of time between the top dead center phase T1 in the compression stroke and the top dead center phase T2 in the exhaust stroke. Due to the opening of the exhaust valve 10, the air in the cylinder 6a flows through the exhaust port 14 into the exhaust duct 15, and the exhaust pressure detected by the exhaust pressure sensor 16 increases.

Consequently, of the two top dead center phases detected with the encoder 5, namely the top dead center phase T1 during the compression stroke and the top dead center phase T2 during the exhaust stroke, the top dead center phase T1, which directly precedes the increase of exhaust pressure detected by the exhaust pressure sensor 16, is the top dead center phase during the compression stroke, so that the top dead center phase of the crankshaft 4 during the compression stroke can be detected.

Consequently, with the engine testing apparatus according to the present invention, it is possible to detect the compression top dead center of the engine under test while the injection nozzle and the spark plug 13 are mounted, by detecting the top dead center phases with the encoder 5 and an increase in the exhaust pressure with the exhaust pressure sensor 16. Also when injection nozzle and spark plug are not mounted, it is possible to detect the compression top dead center of the engine under test by closing the attachment holes for injection nozzles and spark plugs.

Other Embodiments

In the foregoing embodiment, an example was described in which an encoder is provided as a phase-sensor for detecting the phase of the crankshaft 4. It is possible to use a magnetic sensor or an optical encoder as the phase sensor.

There are several options regarding the location of the encoder. As shown in FIG. 1, the encoder 5 may be positioned at the base end of the engine testing apparatus. In this case, it is preferable that the rotary movement of the crankshaft 4 is transmitted to the encoder 5 by a timing belt engaging a pulley attached to the flywheel 4a or the shaft 2a of the engine 1.

As another example of the phase sensor for the crankshaft 4, it is also possible to arrange the phase sensor near the shaft of the electric motor 2 to directly detect the rotation of that shaft. For example, it may be a magnetic sensor detecting a metal piece or a magnet attached to the shaft 2a of the electric motor 2.

If the phase sensor is an optical encoder, then it is possible to detect the top dead center phase by providing a rotor that rotates in synchronization with the crankshaft 4 and in which a slit is formed at a location corresponding to the top dead center of the piston 7, and detecting the phase of the crankshaft 4 that corresponds to the slit position in the rotor using a light-emitting means and a light-receiving means.

Further modifications of the device and method for detecting the top dead center phase of the crankshaft 4 in the present invention are possible.

In the above-described embodiment, an orifice 17 is provided in the exhaust duct 15 downstream of the detection position of the exhaust pressure sensor 16, but the orifice 17 can be replaced by a throttling valve or does not necessarily have to be provided.

In the above-described embodiment, the driving portion 3 rotates the crankshaft 4 through rotation of the electric motor 2, but other kinds of driving means, such as hydraulic motors for example, may be used as appropriate.

In the above-described embodiment, the exhaust pressure sensor 16 and the orifice 17 are provided and the compression top dead center is detected only in the reference cylinder 6a of the four cylinders 6, but it is also possible to change the number of cylinders for which the compression top dead center is measured as necessary.

In the above-described embodiment, a 4-cylinder engine was given as an example of the engine to be tested, but it is possible to change the number of cylinders of the engine to be tested as necessary. Furthermore, it is possible to change the number of intake valves 9 and exhaust valves 10 of the engine to be tested as necessary.

In the above-described embodiment, an apparatus for testing various kinds of engines is disclosed, that includes the compression top dead center detection apparatus of the present invention as one portion, but the present invention also encompasses apparatuses that perform only the detection of the compression top dead center.

What is claimed is:

1. An apparatus for detecting a compression top dead center of an engine to be tested, which can be attached to the engine, comprising:
   an external driving means adapted to be attached to a crankshaft of the engine for rotating the crankshaft of the engine;
   a top dead center detection means for detecting a top dead center phase of the crankshaft;
   an exhaust pressure detection means arranged in an exhaust duct for detecting an exhaust pressure within the exhaust duct, the exhaust duct is connected to an exhaust port of the engine; and
   a controller that detects, of the top dead center phases detected by the top dead center detection means while the crankshaft is rotated by the external driving means, the top dead center phase immediately preceding a rise in the exhaust pressure detected by the exhaust pressure detection means as the compression top dead center.

2. The apparatus for detecting a compression top dead center according to claim 1, further comprising an orifice arranged in the exhaust duct on a downstream side of the exhaust pressure detection means, the orifice reduces a cross-sectional area of the exhaust duct.

3. The apparatus for detecting a compression top dead center according to claim 1, wherein the external driving means is an electric motor.

4. A method for detecting a compression top dead center of an engine to be tested, comprising:
   rotating a crankshaft of the engine with an external driving portion;
   detecting a top dead center phase of the crankshaft;
   detecting an exhaust pressure in an exhaust duct connected to an exhaust port of the engine;
   detecting, of the top dead center phases detected while the crankshaft is being rotated, the top dead center phase that immediately precedes a rise in the detected exhaust pressure as the compression top dead center.

5. The method according to claim 4, further comprising storing the detected compression top dead center as a reference value in a controller.

6. The method according to claim 4, wherein a stroke in which the exhaust pressure is detected includes a comparison of two exhaust pressure values for two times corresponding to two crankshaft phases.

7. The method according to claim 4, further comprising reducing a cross-sectional area of the exhaust duct before detecting the exhaust pressure in the exhaust duct.

8. An apparatus for detecting a compression top dead center of an engine to be tested, which can be attached to an engine, comprising:
   an electric motor adapted to be attached to a crankshaft of the engine for rotating the crankshaft;
   a phase sensor for detecting a top dead center phase of the crankshaft, which corresponds to a top dead center position of a specified cylinder of the engine;
   an exhaust duct connected to an exhaust port of the engine;
   an exhaust pressure sensor arranged in the exhaust duct, the exhaust pressure sensor detects an exhaust pressure; and
   a controller that receives a signal from the exhaust pressure sensor, and that detects, of the top dead center phases detected by the phase sensor while the crankshaft is rotated by the motor, the compression top dead center based on a change in the exhaust pressure detected by the exhaust pressure sensor.

9. The apparatus for detecting a compression top dead center according to claim 8, wherein the controller detects the top dead center phase that immediately precedes a rise in the exhaust pressure as the compression top dead center.

10. The apparatus for detecting a compression top dead center according to claim 8, further comprising an orifice arranged in the exhaust duct on a downstream side of the exhaust pressure detection means, the orifice reduces a cross-sectional area of the exhaust duct.

11. The apparatus for detecting a compression top dead center according to claim 8, wherein the controller controls a rotation speed of the electric motor.

12. The apparatus for detecting a compression top dead center according to claim 8, wherein the phase sensor is a magnetic sensor.

13. The apparatus for detecting a compression top dead center according to claim 8, wherein the phase sensor is an optical sensor.

* * * * *